Figure 1:
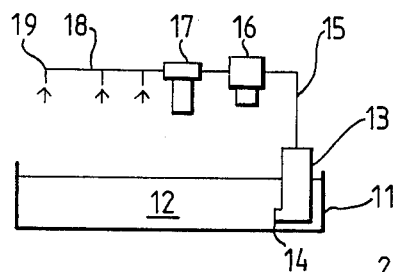

United States Patent [19]

Stevenson

[11] Patent Number: 4,615,413
[45] Date of Patent: Oct. 7, 1986

[54] RECIRCULATING LUBRICATING SYSTEM WITH MONITOR FILTER UNIT

[75] Inventor: Basil C. J. Stevenson, Corton Denham, England

[73] Assignee: Westland plc, Yeovil, England

[21] Appl. No.: 603,412

[22] Filed: Apr. 24, 1984

[30] Foreign Application Priority Data

May 16, 1983 [GB] United Kingdom ............... 8313418

[51] Int. Cl.$^4$ .............................................. F01B 11/10
[52] U.S. Cl. ..................................... 184/6.4; 73/61 R; 184/6.24; 184/108; 210/85; 210/416.5; 210/434
[58] Field of Search .................... 184/6.12, 6.21, 6.24, 184/26, 6.4, 108; 74/467, 468; 210/85, 168, 416.5, 416.4, 434; 116/264, 265, DIG. 42; 123/196 A, 196 S, 198 DA; 73/61 R

[56] References Cited

U.S. PATENT DOCUMENTS

| | | | |
|---|---|---|---|
| 2,979,160 | 4/1961 | Haas | 184/6.24 |
| 3,400,575 | 9/1968 | Madden | 73/61 R |
| 3,771,624 | 11/1973 | Forgeron | 184/6.24 |
| 3,837,432 | 9/1974 | McKendrick | 184/6.24 X |
| 4,362,630 | 12/1982 | Young | 210/85 X |
| 4,513,606 | 4/1985 | Rhynard | 73/61 R |

FOREIGN PATENT DOCUMENTS 133960 11/1946 Australia ..................... 184/6.24

Primary Examiner—Leonard E. Smith
Attorney, Agent, or Firm—Larson and Taylor

[57] ABSTRACT

A recirculating lubricating system includes a monitor filter unit (16) between a pump (13) and a main filter element (17). The monitor filter unit (16) includes diverting means (23, 31) to ensure that a proportion of the oil flowing between the pump and the main filter element is diverted through a removable monitor filter element (28).

2 Claims, 4 Drawing Figures

RECIRCULATING LUBRICATING SYSTEM WITH MONITOR FILTER UNIT

This invention relates to a recirculating lubricating system and particularly to such a system for use in lubricating mechanical components such as gears, bearings etc.

A recirculating lubricating system is a system in which oil is pumped from a sump and through a filter to lubricate one or more mechanical components. The oil then drains back to the sump. Such a system is used for example to lubricate the mechanical components of a helicopter transmission system.

Conventionally, such systems have included a magnetic plug, usually located below the normal oil level in the sump, that is removed at periodic inspection procedures. Any particles adhering to the plug are analysed to provide advanced warning of wear or damage that may have occurred in the transmission system. The disadvantages of such a system are that the plug only attracts particles of magnetic material and then only those which find their way into the sump, and its location in the sump often means that the plug is inaccessible making maintenance and inspection procedures difficult.

Furthermore, the advent of fine filtration i.e., using modern filters of about three microns absolute, has reduced wear of lubricated mechanical components, and such filters are now widely used in lubricating systems of helicopter transmission systems to improve reliability and reduce servicing and overhaul procedures. However, the use of fine filtration also reduces the effectiveness of the existing magnetic plug method of monitoring the condition of the components since much of the debris will have been removed by the fine filter. Consequently, apart from the aforementioned disadvantages of the magnetic plug method, there is a need to provide an efficient monitoring system compatible with improved filtration methods.

Accordingly in one aspect the invention provides a recirculating lubricating system comprising a sump for lubricating oil and a pump adapted to pump oil from the sump and through a main filter element to a plurality of lubricating points from where the oil drains back to the sump, characterised by a monitor filter unit having diverting means adapted to divert a proportion of the oil flowing between the pump and the main filter element through a removable monitor filter element.

The monitor filter unit may include a generally tubular body portion having end portions adapted for connection into the oil flow passage between the pump and the main filter. The monitor filter element may be located in a hollow boss formed integral with the tubular body portion and between an inlet chamber and an outlet chamber.

Conveniently, the diverting means may comprise an integral longitudinal protrusion extending into the hollow body portion and having an inlet opening facing in a direction opposite the normal direction of flow of lubricating oil and connected to the inlet chamber by a passageway.

The outlet chamber may be connected through a passageway in the integral protrusion to an outlet opening facing in the same direction as the direction of lubricating oil flow.

The monitor filter element may be retained by a quick release plug, and the absolute rating particle size of the monitor filter element may be larger than that of the main filter element. For example, the rating of the main filter element may be about three microns and the rating of the monitor filter element may be between twenty and fifty microns.

Figure 2:
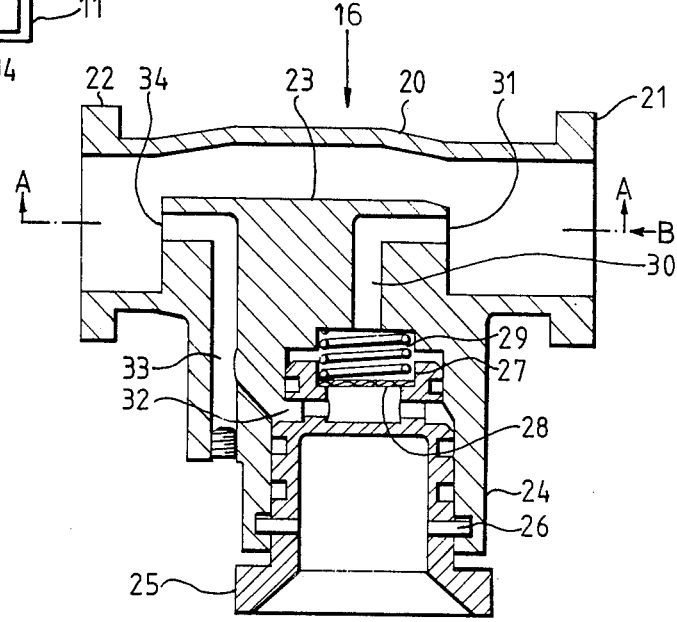
Figure 3:
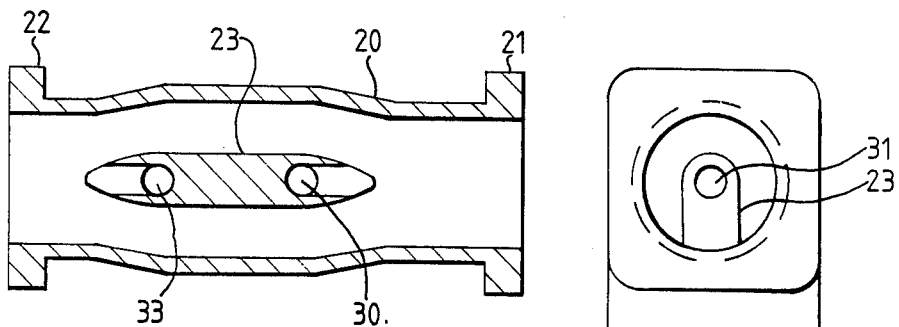
Figure 4:
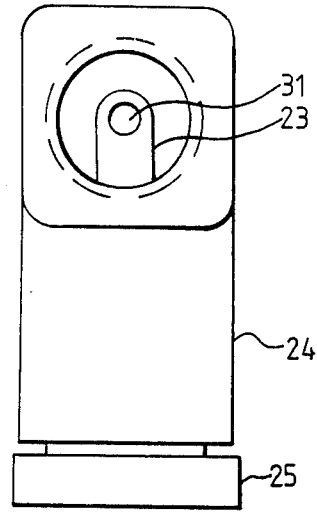

The invention will now be described by way of example only and with reference to the accompanying drawings in which, FIG. 1 is a schematic illustration of a recirculating lubricating system in accordance with the invention, FIG. 2 is a sectioned side elevation of a monitor filter unit incorporated in the system of FIG. 1 and constructed in accordance with one embodiment of the invention, FIG. 3 is a sectioned view of the monitor filter of FIG. 2 taken along lines A—A of FIG. 2, and FIG. 4 is an end elevation of the monitor filter of FIGS. 2 and 3 taken in the direction of arrow B in FIG. 2.

Referring now to FIG. 1, a recirculating lubricating system includes a sump 11 that in use contains lubricating oil 12. A pump 13 having an inlet 14 immersed in the oil 12, is connected by pipe 15 to the inlet of a monitor filter unit 16. The outlet from the monitor filter unit 16 is connected to the inlet of a main filter element 17 and the outlet from the main filter element 17 is connected to a manifold 18 having a plurality of lubricating outlets 19 adapted during operation to direct lubricating oil to mechanical components of a unit such as a helicopter transmission system in which the lubricating system is fitted.

FIGS. 2 to 4 inclusive illustrate a monitor filter unit 16 constructed in accordance with one embodiment of the invention. The filter unit 16 includes a tubular body portion 20 having inlet and outlet flanged end portions 21 and 22 respectively adapted for connection into the pipeline between the pump 13 and the main filter element 17 (FIG. 1).

An integral protrusion 23 extends into the hollow interior of body portion 20 and is elongated longitudinally i.e. in the direction of normal flow of lubricating oil as indicated by arrow B, (FIG. 2). The protrusion 23 has tapered and radiussed ends to minimise obstruction to flow through the body 20.

A boss 24 is formed integral with body portion 20 and is located externally of the body portion 20 and in general alignment with the internal protrusion 23.

The boss 24 is hollow and houses a retainer plug 25 secured by a quick release bayonet attachment 26. An inner end of the plug 25 has a recess 27 providing a seating for a monitor filter element 28 which is retained in position by a spring located in an inlet chamber 29. The chamber 29 is located upstream of the monitor filter element 28 and is connected by a drilled passage 30 in protrusion 23 to an inlet opening 31 facing in the opposite direction to the direction of flow (arrow B) of lubricating oil. An outlet chamber 32 in hollow boss 24 downstream of the monitor filter element 28 is connected by a further drilled passage 33 in boss 23 to an outlet opening 34 facing in the same direction as the direction of flow of lubricating oil (arrow B).

Thus, in operation, it will be noted firstly that the monitor filter unit 16 is located in the main lubricating oil supply line 15 upstream of the main filter element 17. The velocity head of the oil passing through the hollow body portion 20 (FIGS. 2 to 4) ensures that a small proportion of the lubricating oil is diverted through inlet opening 31 and passage 30 in integral protrusion 23 and through the monitor filter element 28. The oil is then returned via the chamber 32, passage 33 and outlet opening 34 to rejoin the main flow through the hollow body 20 from where it subsequently passes through the main filter element 17 to the lubricating outlets 19 in manifold 18.

The "absolute" rating particle size of the monitor filter element 28 will be larger than that of the main filter element 17 and will be selected for a particular installation to collect a sample of particles that are considered to be of a potentially damaging size. For example, in a recirculating lubricating system for a helicopter transmission, the main filter element 17 may have a rating of three microns and the monitor filter 28 may have a rating of between twenty and fifty microns.

At prescribed inspection periods, the quick release plug 25 is withdrawn and the monitor filter element 28 replaced by a new element. Any debris collected on the used monitor filter element 28 is then removed for inspection and analysis. The debris can also be compared with the debris from previous inspection procedures to enable an assessment of types and quantity of debris to provide an efficient indication of the wear state of the mechanical component being monitored.

Alternatively, of course, the rating of the monitor filter element could be selected to allow very small particles to pass through to be trapped by the main filter element 17 and only trap larger particles that would be generated when surface breakdown or damage had already occurred. This will provide an early warning that a full examination is required to prevent a possible failure of the mechanical components being monitored.

Thus, the recirculating lubricating system of this invention includes a monitor filter unit which, firstly, samples the main lubricating oil flow and not simply the oil contained in the sump as with prior magnetic plug devices. Secondly, the monitor filter element 28 traps non-magnetic as well as magnetic debris. Thus, for example debris caused by wear or breakdown of oil seals will be trapped as well as debris of other non-magnetic materials such as titanium, which is now widely used in high technology areas such as helicopter transmission systems, and the copper based materials often used in bearing cages, etc.

Thirdly, since the monitor filter element 16 can be located in the main supply line anywhere upstream of the main filter element 17, it is much more likely that the designer can arrange its location so that the plug 25 is readily accessible, thereby reducing the time required for periodic inspections of the monitor filter element 28. Lastly, the monitor filter 16 of the described embodiment does not reduce the volume of lubricating oil being supplied to the lubricating points, and this is an important consideration in respect of the normally restricted capacity for example in a helicopter transmission system.

While a particular embodiment has been described and illustrated, it will be apparent that many modifications can be made without departing from the scope of the invention. For example, in installations where the velocity head of the lubricating oil is not sufficient to ensure an adequate flow through the monitor filter element 28, the oil from downstream of the monitor filter element 28 can be returned to the outlet side of the main filter element 17. In such a case the pressure drop across the main filter element will ensure a flow through the monitor filter element 28 although it should be noted that in some installations it may be desirable to provide a second filter element in the monitored line of the same rating as the main filter element 17 in order to ensure that the oil returning to the main flow downstream of the main filter element 17 is to the same standard of cleanliness. As a further alternative, in installations in which there is a reserve oil capacity, the outlet from the monitor filter element can be returned directly to the sump. While, in such an installation, the second filter element will not be required, it may be necessary to provide a flow restrictor downstream of the monitor filter element 28 to control the flow rate through the element.

Furthermore, modifications can also be made to the particular construction of the monitor filter unit 16. For example, whilst the individual construction of the unit 16 of the described embodiment ensures replacement without dismantling other components, the removable plug 25 and monitor filter element 28 could be provided integrally with another unit in the system, such as by incorporation in the housing of either the pump 13 or the main filter element 17 of the system described with reference to FIG. 1.

What is claimed is:

1. A recirculating lubricating system comprising a sump for lubricating oil, a pump adapted to pump oil from the sump, a main filter element, a monitor filter unit disposed between the pump and said main filter element, passageway means interconnecting said pump, monitor filter unit and main filter element whereby oil is pumped from the sump through the monitor filter unit and the main filter element to a plurality of lubricating points from where the oil drains back to the sump, said monitor filter unit including a generally tubular body portion having end portions adapted for connection into said oil flow passageway, a removable monitor filter element located in a hollow boss formed integral with said body portion and between an inlet chamber and an outlet chamber, and diverting means comprising a longitudinal protrusion extending into said body portion and having an inlet opening facing in a direction opposite the normal direction of flow of the lubricating oil whereby a proportion of the oil flowing between the pump and the main filter element is diverted to flow through the inlet chamber, the monitor filter element and said outlet chamber to be returned to the flow of oil upstream of the main filter element.

2. A recirculating lubricating system as claimed in claim 1 wherein the longitudinal protrusion is integrally formed with said tubular body portion and the outlet chamber is connected through a passageway in the integral protrusion to an outlet opening facing in the same direction as the direction of lubricating oil flow.

* * * * *